Figure 1:
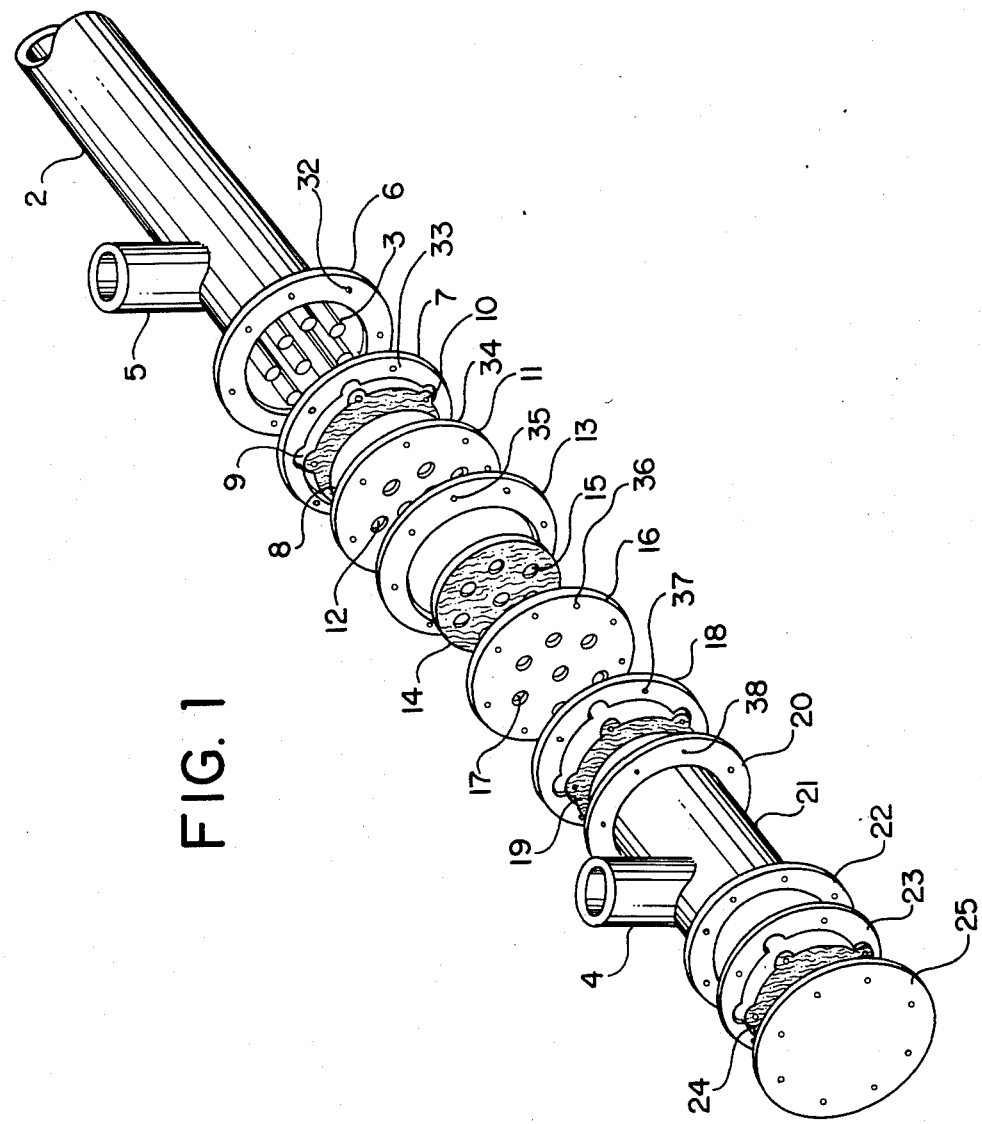

United States Patent [19]

Flamm et al.

[11] Patent Number: 4,691,769
[45] Date of Patent: Sep. 8, 1987

[54] COMPRESSION SEALING OF TUBES WITHIN SHELL AND TUBE HEAT EXCHANGER

[75] Inventors: Katherine K. Flamm, Baltimore; J. Kyle Gilley, Columbia; David F. Geary, Severna Park; Edward N. Schinner, Highland, all of Md.

[73] Assignee: Baltimore Aircoil Company, Inc., Jessup, Md.

[21] Appl. No.: 883,477

[22] Filed: Jul. 14, 1986

Related U.S. Application Data

[63] Continuation of Ser. No. 647,584, Sep. 5, 1984, abandoned.

[51] Int. Cl.⁴ .............................. F28F 9/02; F28F 7/00
[52] U.S. Cl. ........................................ 165/158; 165/76; 165/173; 285/137.1; 285/363; 285/910
[58] Field of Search ................. 165/76, 158, 173, 159; 285/910, 137.1, 363, 368

[56] References Cited

U.S. PATENT DOCUMENTS

| 2,191,044 | 2/1940 | Seligman | 285/910 |
|---|---|---|---|
| 2,195,003 | 3/1940 | Danvers | 285/363 |
| 2,196,683 | 4/1940 | Pickstone | 165/158 |
| 2,513,178 | 6/1950 | Jackson | 285/910 |
| 2,762,611 | 9/1956 | Monroe et al. | 165/173 |
| 3,302,953 | 2/1967 | Glasgow | 285/363 |
| 3,561,793 | 2/1971 | Rode | 285/363 |
| 3,573,870 | 4/1971 | Gastineau | 285/363 |
| 3,704,021 | 11/1972 | Barbarin et al. | 285/368 |
| 4,026,565 | 5/1977 | Jelinek | 285/368 |
| 4,155,571 | 5/1979 | Gastineau et al. | 285/910 |
| 4,373,580 | 2/1983 | Gossalter | 165/175 |
| 4,520,868 | 6/1985 | Grawey | 165/159 |

FOREIGN PATENT DOCUMENTS

| 578171 | 6/1924 | France | 165/158 |
|---|---|---|---|
| 1215181 | 4/1960 | France | 165/158 |
| 1347196 | 11/1963 | France | 165/159 |
| 191441 | 10/1956 | Netherlands | 165/173 |
| 0009149 | of 1900 | United Kingdom | 285/910 |
| 1061419 | 3/1967 | United Kingdom | 285/363 |
| 1434754 | 5/1976 | United Kingdom | 165/158 |
| 463852 | 9/1975 | U.S.S.R. | 165/173 |
| 0964427 | 10/1982 | U.S.S.R. | 165/158 |
| 983428 | 12/1982 | U.S.S.R. | 165/76 |

Primary Examiner—William R. Cline
Assistant Examiner—John K. Ford
Attorney, Agent, or Firm—Edward J. Brosius; Charles E. Bouton

[57] ABSTRACT

The invention relates to improved sealing means for shell and tube heat exchangers which means use only components which are external to the heat exchanger shell to mechanically compress a series of rubber type gaskets and incompressible tube sheets to thereby seal the tube to tube sheet joints and the tube sheet to shell joints in such a manner as to precisely control the degree of compression of the rubber type gaskets and eliminate the need for the retightening of bolts by the use of confining elements on the outer periphery of said gaskets.

13 Claims, 2 Drawing Figures

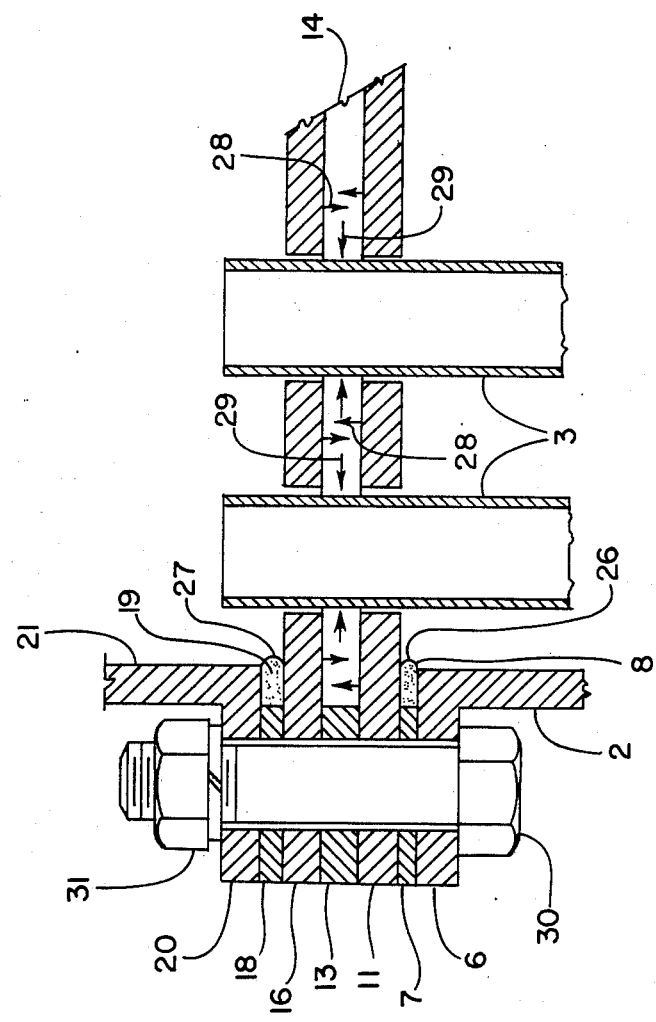

COMPRESSION SEALING OF TUBES WITHIN SHELL AND TUBE HEAT EXCHANGER

This is a continuation application of pending prior application Ser. No. 647,584 filed on Sept. 5, 1984 of K. Flamm et al., now abandoned.

BACKGROUND OF THE INVENTION

There have been a number of devices and sealing means used to seal the tubes and shells in tube and shell heat exchangers so that fluid flowing in either medium would not intermingle.

Typically, brazing, welding or roller-expansion methods have been used to seal the tube to tube sheet joints and tube sheet to shell joints in a typical shell and tube heat exchanger. The disadvantages of these sealing methods are: (1) that the individual tubes cannot be easily removed, (2) the shell side cannot be cleaned mechanically, and (3) any use of plastic baffles in the shell may melt during brazing, or welding.

Other methods have been used to compression seal the tubes to the tube sheet, joints and the tube sheets to the shell joints in a typical shell and tube heat exchanger, however none of such prior methods controlled or limited the amount of compression applied to the gaskets. There were several disadvantages to previous methods of compression sealing. One method required the tube sheet to be welded to the shell. This prevented access to the internal shell area for a cleaning or replacement of tube support baffles and allowed tubes to be replaced only singly and by very complicated procedures. Several methods required the presence of internal welded lugs or tube sheet end stops which complicated the removal of tube support assemblies and prevented the use of conventional tube support baffles. Another method required the presence of removable pressure-transfer devices in place of welded lugs and these components obstructed flow in and out of shell and tube nozzles causing wasted energy due to excessive pressure losses. Another method required the use of very close tolerance components to effectively seal the shell wall end section of the shell component.

A final method involved the use of compressible rubber tube gasket and metal tube sheets which suffered from the defect that the degree of compressive force of the rubber gaskets could not be precisely controlled. Too little or too much compression force could cause the seals to fail with the development of leaks. The only control was the torque applied to the bolts which had to be within a specified range. This necessitated more tedious assembly process to prevent failure of the seals. In addition, this method could lead to a bulging deformation of the outer edges of the rubber gaskets, particularly under high compressive forces. This commonly resulted in the use of extended containment straps to attempt to minimize the bulging deformation of the rubber gaskets.

SUMMARY OF THE INVENTION

The invention herein relates to a method for sealing typical shell and tube heat exchangers so that the fluid, flowing on the outside of tubes (hereinafter referred to as shell side) and the inside of the tubes (hereinafter referred to as tube side) would not be intermingled. The sealing means uses only components which are external to the heat exchanger shell to mechanically compress a series of radially expandable rubber-type gaskets between metal tube sheets and shell flanges and thereby simultaneously seal (1) the tube to the tube sheet joints and (2) the tube sheet to the shell joints in a typical shell and tube heat exchanger in such a manner so that the outer rim gasket retainers limit the compression of the rubber gaskets to avoid all outwardly extruding deformation, facilitate assembly by minimizing or eliminating the need to control bolt torque, avoids the use of containment straps external to the flanges, and eliminates the need for the retightening of bolts after the initial assembly.

Thus, it is an object of this invention to use a seal in a shell and tube heat exchanger having precisely controlled gasket compression using a combination of compressible gaskets and less compressible peripheral gasket retainers.

It is a further object of the invention to provide a sealing means for shell and tube heat exchangers which sealing means uses relatively incompressible peripheral flange gasket and tube sheet gasket retainers and compressible, internally contained, flange and tube sheet gaskets to control the degree of compression.

A further object of the invention is to provide a shell and tube heat exchanger sealing means wherein the individual tubes within the shell and tube heat exchanger can be easily removed for cleaning or replacement.

A further object of the invention is to provide a shell and tube heat exchange sealing means wherein the shell side of said shell and tube heat exchanger can be mechanically cleaned.

A further object of the sealing means of this invention is to allow removal from the shell, the complete assembly of all tubes with all the support baffles and baffle spacers.

A still further object of this invention is to provide a gasket compression sealing means for shell and tube heat exchangers wherein the material used for the tubes does not have to be limited to those which can be brazed, rolled or welded. A still further object is to provide a sealing means wherein baffles used within the shell and tube heat exchanger to direct the flow of the shell-side fluid could be made of plastic, which otherwise may melt during brazing when using the prior art designs.

To better understand the invention there are shown provided two Figures. FIG. 1 is an isometric cut-away view of the sealing means on one end of the improved shell and tube heat exchanger.

FIG. 2 shows a cross-sectional view of the typical improved tubes and flange sealing means.

Referring now to FIG. 1, there is shown a typical shell and tube heat exchanger 1 consisting of a shell 2 and a plurality of tubes 3 located within the shell, preferrably in a symmetrical or evenly-spaced pattern within the shell 2. Any fluid flowing within the tubes 3 enters the tubes or leaves the tubes through a conduit tube side connection 4. Fluid flowing outside the tubes but within the shell 2 enters or leaves the shell and tube heat exchanger 1 through the shell side conduit connection 5. Only one side or one end of the typical shell and tube heat exchanger is shown in FIG. 1, but our sealing means would similarly apply to the other end of the shell and tube heat exchanger which is not shown.

There is provided a flange portion 6 on the end of the shell 2. This flange portion is usually welded onto the outside end of the shell. Adjacent to the flange 6 is a flange gasket retainer 7 surrounding an internal flange gasket 8. The flange gasket fits against the inner portion of the face of flange 6 and has an annular clear central portion so that the tubes 3 can pass therethrough. The flange gasket retainer is made of relatively incompressible material and fits against the outer portion of the face of flange 6 not occupied by the flange gasket. The flange gasket retainer may have indentations 9 with matching protrusions 10 on the flange gasket to facilitate alignment during assembly.

Adjacent the flange gasket retainer 7 and the flange gasket 8 is a tube sheet 11. The tube sheet is made of any rigid material typically steel, brass, or stainless steel or it can be made of other materials such as plastics or reinforced plastics. The tube sheet 11 is of a preferably circular design and has individual holes 12 therethrough corresponding to and in alignment with the individual tubes 3, which holes are of a slightly larger diameter than the outer diameter of the tubes 3 so that the tube-ends can pass through the holes, and the tube sheets can exert a precisely controlled force to compress the tube sheet gasket 14 to the proper extent to prevent tube seal leaks. However the holes for the tubes 3 should not be so large as to prevent the formation of an effective seal by the tube sheet gasket 14 upon the compression by the tube sheet 11 and 16.

Adjacent to the metal tube sheet 11 is a relatively incompressible tube sheet gasket retainer 13 surrounding a tube sheet gasket 14. This gasket is circular and is solid-faced except for individual holes 15 therein, which holes again line up with the tubes 3 and tube sheet holes 12 and 17. The diameter of these holes 15 can be slightly smaller than the outside diameter of the tubes 13 in order to maximize the gasket compressive sealing force.

Next to the gasket 14 is another metal tube sheet 16 with holes 17 therein, similar to those described for the metal tube sheet 11.

Adjacent to the metal tube sheet 16 is flange gasket retainer 18 and flange gasket 19 which fits against the annular circular flange 20. Flange gasket retainer 18 and flange gasket 19 are similar to flange gasket retainer 7 and flange gasket 8 previously described. The entire series of flange gaskets and metal tube sheets are then adjacent to flange 20 which is located at the end of extension shell 21.

Extension shell 21 is an extension or continuation of shell 2 and is fitted with a tube side connection 4 through which fluid flowing within the tubes enters or leaves. Extension shell 21 is also preferably fitted with flange 22 on its other closure end (when contrasted with flange 20) so that the extension shell 21 of the shell 2 can be sealed off from the outside atmosphere. This is accomplished by having end closure flange 22 part of the extension shell 21 and having adjacent to flange 22, an annular flange gasket retainer 23 and flange gasket 24 similar to gasket retainers 7 and 18 and gaskets 8 and 19 and finally having an end plate or end closure 25 sealing the end of the extension shell 21 of the shell and tube heat exchanger 1.

In a further embodiment of the instant invention the gaskets and their respective retainers, both flange and tube sheet, can be of unitary construction with an outer portion of relatively incompressible material and an inner compressible section. The unitary gasket and retainer would be made with a thicker gasket section as is discussed below. The gasket and retainer sections of the unitary device could be made of like materials by varying the density during manufacture, or the device could be made of unlike materials which could be bonded together using various bonding techinques or the gasket and retainer sections of the unitary device could be molded in an integral fashion. Such a unitary device would ensure that there would be no gap between the gasket and retainer to absorb the compression deformation of the gasket.

In each of the paired concentric gaskets and gasket retainers, or unitary gasket and retainer, the gasket is of a thickness which is greater than that of the surrounding gasket retainer. In addition, the outer surfaces of the gaskets are closely matched in size to the inner surfaces of the gasket retainers to ensure that the sealing forces of the gasket, achieved upon the compression of the gaskets through the application of the bolting compressive forces to the assembly, will be directed inwardly in the case of the flange gaskets 8, 19 and 24 and circumferentially around the tubes 3, in the case of the tube sheet gasket 14. A close fit of the outer surface of the gasket within the gasket retainer will help to ensure that the deformation of the gasket will be properly directed upon the application of the compressive forces.

As can be seen in FIG. 2, when one draws flange 6 and flange 20 closer together to thus compress the two flange gaskets 8 and 19 the compression will cause the gasket to expand radially inward thus causing a slight bulging deformation of the gasket as seen in 26 and 27. When the tube sheet gasket 14 is compressed by the application of the compressive force by the tube sheets 11 and 16 the deformation thus caused is constrained in all directions. This results in the application of a sealing force directed radially inward on each of the tubes 3. This is illustrated in FIG. 2 wherein the compressive forces are represented by vertical arrows 28 and the sealing forces are represented by arrows 29.

When the bolt 30 and the nut 31 are tightened causing the application of the compressive force to everything between the flanges 6 and 20 the distance the flange 6 and 20 can travel towards each other is limited since all of the flange gasket retainers 7 and 18, the tube sheets 11 and 16 and the tube sheet gasket retainer 13 are all made of relatively incompressible materials. Thus, when the bolt 30 and nut 31 are tightened to the extent shown in FIG. 2, the application of additional torque to the nut and bolt assembly will not cause any additional forces to be applied to the flange gaskets 8 and 19 and the tube sheet gasket 14. This prevents the application of excess forces to the various gaskets which would result in excess distortion of such gaskets and the failure of the seals. This also facilitates the assembly of the apparatus since the time consuming use of special torque wrenches to accurately control the degree of compression of the gaskets is not required.

The magnitude of the compressive forces 28 and the resultant sealing forces 29 is determined by controlling the relative thickness of the tube sheet gasket 14 with respect to the tube sheet gasket retainer 13. Generally the gasket retainer is from 10 to 90% of the thickness of the respective gasket. Preferably the gasket retainer is from 50 to 70% of the thickness of the respective gasket. For a very large heat exchanger with larger diameters or number of tubes 3, a thicker tube sheet gasket relative to the retainer may be desired.

The ability of the gasket to deform upon the application of the compressive forces 28 and thus to apply the sealing forces 29 is determined by the flexibility of the gasket material. The deformability of rubber is determined by its durometer rating. A durometer rating of from 20 to 80 is desirable since if the rubber or other gasket material is too hard the compression forces will not be able to deform the gasket sufficiently to effect a proper seal. If the rubber or other gasket material is too soft, the seal which is formed will not be able to withstand the pressures exerted upon it by the pressure of the heat exchange liquid in the apparatus. The preferred durometer rating for the tube sheet gasket 14 is from 40 to 50 and the preferred durometer rating of the flange gaskets 8 and 19 is from 55 to 65. Where the tube sheet or flange gasket retainers is to be made of a non-metallic material, it preferably should be made of a material with a durometer rating in excess at 80.

The flange gaskets 8 and 19, the tube sheet gasket 14, flange gasket 24 and optionally the gasket retainers, can be made of any sealable and flexible material particularly rubber or any type of elastomeric material which would not tend to corrode or decompose in the presence of the fluid used in the shell and tube heat exchangers. The elastomeric materials would be made at difference levels of hardness to suit particular purposes as was discussed above. Another modification of the flange gaskets is to provide shaped protrusions which encompass a mounting hole. This arrangement facilitates the assembly of the unit by allowing the gasket to be retained in position during such assembly. Generally 2 to 4 such protrusions are adequate.

The tube sheet 11, 16 and end closure 25 are made of non-compressible material and preferably of metal such as steel, brass or stainless steel. The entire sealing means is compressed by any means but particularly by the use of bolts 30 which fit through holes 32 in the flange 6 and correspondingly fit through singly aligned holes 33 in flange gasket retainer 7 holes 34 in the tube sheet 11 or holes 35 in the tube sheet gasket retainer 13, holes 36 in the tube sheet 16, holes 37 in the flange gasket retainer 18 and finally holes 38 in the flange 20. Once the bolt extends through the holes 38 in flange 20, nuts 31 can be screwed onto the threaded portion of bolts 30 and the entire ensemble tightened to thus force the flanges and tube sheets to compress the flange gaskets 8 and 19 and tube sheet gasket 14 and thus effectively seal the shell and tube heat exchanger.

Similarly, the end of the extension shell 21 can be sealed from the atmosphere by means of compressing the end closure 25 to flange 22 and flange gasket retainer 23 to thus compress the flange gasket 24. Removal of end closure 25 will permit the mechanical cleaning of the interior of tubes without removing or disturbing the tube compression seals or any external piping connections. The holes through which the bolts pass can be equally spaced around the entire annulus of the flanges which extend above the outer diameter of the shell 2 and shell extension 21. Typically there would be about 20 holes of about ½ inch diameter on a flange attached to an 8 inch diameter shell.

The instant arrangement of gaskets within gasket retainers, which prevents outward distortion of the gaskets, also allows for shell and tube heat exchangers to be constructed for use with higher internal pressure duties. Indeed, this invention can be employed to increase the range of application to considerably higher internal design pressures than that possible with some older designs wherein gaskets extended to the full diameter of the flange. By tightening bolt 30 with nut 31 the assembly closes to prevent any exposure of the gaskets and to completely seal all gaskets within a contained chamber and away from all atmospheric effects. This allows for a much wider range of internal pressure duties.

The circular flanges 6 and 20, flange retainers 7 and 18, tube sheets 11 and 16, tube sheet gasket retainer 13 and gaskets 8, 14 and 17 described is preferred. However, an alternate logically-arranged configuration of gaskets, retainers, flanges and tube sheets is visualized which are identical in arrangement of the described assembled components, but have an outer periphery of square, hexagonal or other non-circular configuration, while retaining preferably circular-shaped internal holes, shell and extension shell. Also, non-circular tubes and gasket holes can be utilized effectively with this design concept. In this optional configuration, one might envision and accomplish certain advantages of reduced manufacturing cost or reduced material scrap ratios when fabricating multiples of components such as flanges, gaskets or tube sheets by conventional high speed manufacturing methods.

While the outer shell end closure 25, gasket 24, flange 22 and gasket retainer 23 assembled using nuts and bolts represent the preferred mechanical arrangement to allow the most ideal accessibility for maintenance and repair or reassembly of all internal components, an alternate variation, potentially of lower cost employing a welded end cap to completely close the outer end of the extension shell 32 may be employed to perform the required closure of the outer end of the extension shell 32, eliminating the need for flange 22, gasket 24 flange gasket retainer 23 and utilizing an end closure without holes, by merely welding all around the periphery thereof to the shell 21. However, this will preclude the ability to clean the interior of tubes, unless inlet or outlet and piping connections are dismantled and the improved compression seal assembly of this invention is dismantled.

The above description refers to an illustration of the invention and is not intended to be a limitation thereof. Those skilled in the art would realize that other embodiments falling within this invention are possible and these embodiments are intended to be claimed by Applicants.

What is claimed is:

1. A shell and tube heat exchanger sealing means comprising a shell and an extension shell for sealing the tubes within the shell so that fluid flowing from the extension shell into the tubes within the shell is separated from the fluid flowing within the shell, which comprises a shell flange and an extension shell flange, two incompressible tube sheets and a tube sheet gasket with holes therethrough for the tubes, a relatively incompressible tube sheet gasket retainer in circumferential arrangement around the tube sheet gasket and two flange gaskets each with a circumferentially arranged flange gasket retainer adjacent to the shell and extension shell flanges, wherein said flange gaskets include protrusions along an outer circumference thereof and said flange gasket retainers include complementary indentations along an inner circumference thereof, wherein the tube sheet gasket and flange gaskets are thicker than the respective tube sheet gasket retainer and flange gasket retainers so as to compress and radially expand the flange gaskets an amount limited to the radial inner dimension of the flange gasket retainers and compress and radially expand the tube sheet gasket an amount limited to the width and radial inner dimension of the sheet gasket retainer so that said gaskets effectively seal the tubes from the inner shell of the shell and tube heat exchanger and to seal the shell and the extension shell from each other and from the atmosphere upon the application of a compressive force applied by tightening bolts extending through holes radially external to the shell in the shell flange and extension shell flange.

2. The shell and tube heat exchanger sealing means of claim 1 wherein the tube sheet gasket and the tube sheet gasket retainer are made of unitary construction.

3. The shell and tube heat exchanger sealing means of claim 1 wherein the flange gasket and flange gasket retainer are made of unitary construction.

4. The shell and tube heat exchanger sealing means of claim 2 wherein the tube sheet gasket retainer and the flange gasket retainer have a thickness which is from 50 to 70% of the thickness of the respective tube sheet gasket and flange gasket.

5. The shell and tube heat exchanger sealing means of claim 1 which additionally includes on the extension shell(s), an end closure flange gasket, an incompressible end closure flange gasket retainer in circumferential arrangement about the end closure flange gasket, solid full-face plate end closure and flange portion of the closure end of the shell extension of the shell and tube heat exchanger wherein the end closure flange gasket retainer is from 10 to 90% of the thickness of the end closure flange gasket and the end closure flange gasket is compressed between the flange portion and the full-face plate end closure at the end of the extension shell.

6. The shell and tube heat exchanger sealing means of claim 5 wherein the end closure flange gasket retainer is from 50 to 70% of the thickness of the end closure flange gasket.

7. The shell and tube heat exchanger sealing means of claim 5 wherein the compressive force between the flange portion and the full face plate end closure is applied by bolts and nuts.

8. The shell and tube heat exchanger sealing means of claim 1 wherein the gaskets are made of elastomeric material.

9. The shell and tube heat exchanger sealing means of claim 1 wherein the tube sheet gasket and flange gasket have a durometer rating of from 20 to 80.

10. The shell and tube heat exchanger sealing means of claim 9 wherein the tube sheet gasket has a durometer rating of from 40 to 50, and the flange gasket has a durometer rating of from 55 to 65.

11. The shell and tube heat exchanger sealing means of claim 1 wherein the tube sheets, tube sheet gasket retainers and flange gasket retainers are made of a non-compressible metal or rigid synthetic materials.

12. The shell and tube heat exchanger sealing means of claim 1 wherein the tube sheet gasket retainer and the flange gasket retainer is made of a metal.

13. The shell and tube heat exchanger sealing means of claim 1 wherein the tube sheet gasket retainer and the flange gasket retainer is made of a relatively incompressible material having a durometer rating in excess of 80.

* * * * *